Patented Apr. 17, 1945

2,373,754

UNITED STATES PATENT OFFICE 2,373,754

STABILIZATION OF BUTADIENE-1,3 HYDROCARBONS

Charles F. Fryling, Akron, and Waldo L. Semon, Silver Lake, Ohio, assignors to The B. F. Goodrich Company, New York, N. Y., a corporation of New York No Drawing. Application August 15, 1942, Serial No. 454,976

4 Claims. (Cl. 260—666.5)

This invention relates to the stabilization of 1,3-diolefins such as butadiene-1,3 hydrocarbons against polymerization and has as its principal object to provide a class of materials which will preserve butadiene-1,3 hydrocarbons in the monomeric condition for long periods of time when present in exceedingly small amounts.

It is known that 1,3-diolefins including butadiene-1,3 hydrocarbons such as butadiene-1,3 itself, commonly called butadiene, and its hydrocarbon homologs such as isoprene, 2,3-dimethyl butadiene-1,3, piperylene and the like readily polymerize under a variety of conditions to form polymeric products ranging in properties from viscous liquids to rubbery solids. In fact the tendency of such hydrocarbons to polymerize is so pronounced that partial polymerization to form polymeric products of little or no technical value occurs even when they are stored in the absence of added materials and under conditions which do not favor polymerization. When, however, butadiene-1,3 hydrocarbons, either alone or in admixture with other polymerizable material such as styrene and acrylonitrile, are allowed to polymerize in the form of an aqueous emulsion, rubbery polymers of great technical value are obtained and accordingly this process is now widely used for the production of so-called synthetic rubber.

In order to obtain the highest possible yield of valuable synthetic rubbery polymers from butadiene-1,3 hydrocarbons by this emulsion polymerization process it is obviously desirable that the hydrocarbons utilized be substantially all present in the monomeric rather than the polymerized or partly polymerized state immediately before use. And, since the butadiene-1,3 hydrocarbons must often be stored for long periods of time before use, this condition is achieved only when some method is provided for preventing their polymerization and preserving them in the monomeric state. To this end polymerization inhibitors such as phenyl beta-naphthylamine, hydroquinone, pyrogallol, copper oleate, tertiary-butyl catechol and the like have been added to the monomeric butadiene-1,3 hydrocarbons but this method of stabilization has not been entirely satisfactory because of the fact that relatively large proportions of these relatively expensive materials must be added to effect a permanent stabilization and because of the further fact that these materials must be removed prior to the emulsion polymerization else the emulsion polymerization is retarded or even prevented and the properties of the synthetic rubber products are seriously impaired.

We have now discovered a class of inexpensive readily-available materials which are capable of permanently stabilizing butadiene-1,3 hydrocarbons against polymerizations which occur during storage even when present in exceedingly small amounts. This class of stabilizers comprises aliphatic mercaptans containing from 1 to 10 carbon atoms that is, compounds containing at least one —SH group attached to an aliphatic residue, usually an aliphatic hydrocarbon residue, containing no more than 10 carbon atoms. Typical examples of such aliphatic mercaptans include methyl mercaptan, ethyl mercaptan, ethylene mercaptan, n-propyl mercaptan, allyl mercaptan, n-butyl mercaptan, isoamyl mercaptan, n-hexyl mercaptan, isohexyl mercaptan, n-heptyl mercaptan, n-octyl mercaptan, 2-ethylhexyl mercaptan, 1-methyl heptyl mercaptan, n-nonyl mercaptan, decyl mercaptan and the like.

The preferred stabilizers are those aliphatic mercaptans which contain from 6 to 10 carbon atoms, inclusive, since butadiene-1,3 hydrocarbons containing these preferred stabilizers, even though they are stabilized against polymerization under storage conditions, are readily polymerizable when emulsified in an aqueous emulsion either alone or in admixture with other polymerizable compounds which are copolymerizable therewith in aqueous emulsion such as acrylonitrile, styrene, methyl methacrylate and the like. As a result it is unnecessary to remove these preferred stabilizers from butadiene-1,3 hydrocarbons containing them before the latter are used in the production of synthetic rubber by the emulsion polymerization process. As a matter of fact it has been found that the presence of these mercaptans actually improves the emulsion polymerization since products which are more plastic and soluble in benzene are obtained.

The amounts of the mercaptans required to stabilize the butadiene against polymerizations occurring under storage conditions is exceedingly small being less than 1% and preferably from 0.001 to 0.1% of the butadiene. The smaller preferred amounts of any of the mercaptan stabilizers are quite effective in their stabilizing action and are not necessarily removed before using the butadiene in emulsion polymerization since the presence of these small amounts of stabilizers does not retard the emulsion polymerization nor deleteriously affect the properties of the synthetic rubber obtained.

The mercaptan stabilizers of this invention are generally liquids under ordinary conditions and are soluble in liquid monomeric butadiene-1,3 hydrocarbons; hence to prepare the stabilized compositions the mercaptan is simply dissolved in the monomeric butadiene-1,3 hydrocarbon. Although butadiene-1,3 is a gas at ordinary temperature and pressure it is usually stored under pressure in the liquid condition.

Butadiene-1,3 hydrocarbons stabilized with the mercaptans of this invention may be stored for long periods of time and under any ordinary storage conditions without any polymer formation taking place. They may be stored in glass or metal containers, in the light or in the darkness and at ordinary room temperatures without polymerization occurring. They may be transported in tank cars or the like where agitation of the stabilized composition during storage takes place with the same excellent results.

In one embodiment of the invention 0.03% by weight of n-heptyl mercaptan was added to substantially pure monomeric liquid butadiene-1,3 and the resulting composition was then allowed to stand at room temperature in the light in a sealed glass tube for 14 months. Despite the fact that the butadiene was exposed to light, a condition which favors polymerization, at the end of the 14 months the butadiene was still perfectly preserved in the monomeric condition there being not the slightest trace of polymer formation. A sample of this stabilized butadiene was then mixed with acrylonitrile and polymerized in an aqueous emulsion containing a fatty acid soap and hydrogen peroxide. A 93% yield of a good quality synthetic rubber was obtained in 85 hours. When using freshly distilled butadiene in the same recipe the polymerization also required 85 hours to produce a 93% yield but the synthetic rubber obtained was not so plastic and soluble in benzene as that obtained using the butadiene stabilized with n-heptyl mercaptan, thus showing that the presence of n-heptyl mercaptan in the butadiene did not retard the polymerization and actually produced a more valuable product.

Similar results may be obtained when other aliphatic mercaptans containing no more than 10 carbon atoms in concentrations less than 1% by weight are employed in place of n-heptyl mercaptan and when other butadiene-1,3 hydrocarbons are stabilized in place of butadiene. Moreover, similar results are secured when the butadiene-1,3 is stored in metal containers and when the stabilized composition is allowed to stand for longer periods of time. It is not intended, therefore, that the invention be limited by the specific embodiment but only by the spirit and scope of the appended claims.

We claim:

1. A stabilized butadiene-1,3 composition consisting of monomeric butadiene-1,3 and less than 1% by weight of an aliphatic mercaptan containing from 6 to 10 carbon atoms, said stabilized butadiene-1,3 being stable against polymerization under storage conditions but being readily polymerizable in aqueous emulsion.

2. A stabilized butadiene-1,3 composition consisting of monomeric butadiene-1,3 and from 0.001 to 0.1% by weight of an aliphatic mercaptan containing from 6 to 10 carbon atoms, said stabilized butadiene-1,3 being stable against polymerization under storage conditions but being readily polymerizable in aqueous emulsion.

3. A stabilized butadiene-1,3 composition consisting of monomeric butadiene-1,3 and less than 1% by weight of n-heptyl mercaptan.

4. A stabilized 1,3-diolefin composition consisting essentially of a monomeric 1,3-diolefin and less than 1% by weight of an aliphatic mercaptan containing from 6 to 10 carbon atoms, said stabilized 1,3-diolefin being stable against polymerization under storage conditions but being readily polymerizable in aqueous emulsion.

CHARLES F. FRYLING.
WALDO L. SEMON.